Patented Oct. 15, 1935

2,017,417

UNITED STATES PATENT OFFICE 2,017,417

GARBAGE, ASHES, AND REFUSE DISPOSAL AND LAND RECLAMATION PROCESS

REISSUED

Lewis M. McCarthy, Jamaica, N. Y.

No Drawing. Application November 6, 1933,
Serial No. 696,922

1 Claim. (Cl. 61—35)

This invention relates to a garbage, ashes, and refuse disposal and land reclamation process and has for an object to provide a process of simultaneously disposing of garbage, ashes, and refuse and of reclaiming low lying lands, especially bogs or swamps or low lying properties in the neighborhood of the shore or beach.

A further object of this invention is to provide a process of disposing of objectionable garbage, ashes, and refuse in such a manner as to permanently dispose thereof and at the same time to raise the level of low lying land a desired extent from ten to twenty feet.

A further object of this invention is to provide a systematic burying process for eliminating all traces of smell or other objectionable after effects which will not only dispose of the garbage, ashes, and refuse, but at the same time makes the land more favorable because it is raised to a desired height.

With the foregoing and other objects in view, as will hereinafter become apparent, this invention comprises the methods and processes hereinafter disclosed and claimed.

In carrying out the objects of this invention an extensive low lying territory is chosen. Such territories are often found in the neighborhood of the shore or the beaches and are of little value principally because of their low level and usually swampy nature. Flushing bog in New York is an example of a territory suitable for this process.

In carrying out this invention a deep long trench of the height that it is desired to raise the land is dug along one edge of the territory, preferably by a steam or gas shovel. If the territory is close to a beach or is partly within the limits of the high tide, then a sand sucker may be used for the purpose of digging the trench. As the trench is dug the soil therefrom is disposed along one side thereof, thereby raising the level of the adjacent ground along that edge of the trench. The garbage, ashes, and refuse are then brought to the trench in any convenient customary manner such as by garbage trucks if the land is of such a nature to allow access thereto. If the land is too soft temporary wooden roadways would be built along the edge of the trench, allowing access thereto.

Then the garbage, ashes, and refuse is dumped into the bottom of the trench commencing at one end thereof and proceeding progressively along the trench. As soon as the garbage, ashes, and refuse has been deposited to a sufficient depth at one edge of the trench, a second trench is dug adjacent the first trench. The dirt being dug from the second trench is deposited on top of the garbage, ashes, and refuse in the first trench, while the second trench is being dug, thus burying the garbage, ashes, and refuse in the first trench and raising the level of the land thereover.

The trenches will be dug of sufficient depth so that the garbage, ashes, and refuse when buried will be covered by at least from six to ten feet of soil so that the garbage and refuse decompose in a slow process and amalgamates itself with the soil as though the territory were a cemetery.

With the garbage and refuse thus disposed of by burial it is not accessible to rats because all possible food is buried too deep for access to rats or other vermin.

When the land within the limits between the low and high tide water is being raised above high water mark, the garbage, ashes, and refuse can be brought to these places by garbage trucks and dumped into the trench prepared by the sand sucker. Then as the trench is filled with garbage, ashes, and refuse the sand sucker provides an additional trench alongside depositing the sand from the second trench on top of the garbage, ashes, and refuse in the first trench.

Valuable land is thus reclaimed and made much more useful. Likewise the garbage, ashes, and refuse is disposed of in a satisfactory manner at much less expense and with more valuable results than with the present methods of burning the garbage and refuse in an incinerator or dumping it at sea, the process of dumping garbage, ashes, and refuse at sea having the obvious objectionable feature that the currents and tides cast vast portions thereof on adjacent beaches polluting the tide waters and beaches and destroying the value thereof.

The process of this invention is most valuable in the neighborhood of large cities having large amounts of garbage, ashes, and refuse to dispose of and at the same time having vast areas of otherwise worthless land. After the land is reclaimed in this manner and its height has been suitably raised, it may be used for any desired purpose, residentail, business or otherwise. The process is so valuable from the standpoint of increasing the value of the land that the city can derive revenue therefrom by charging a fee for increasing the value of privately owned low lying land instead of as in the present manner of having to pay for the expense of disposing of the garbage.

By making the digging of the trenches, the depositing of garbage, ashes and refuse and the digging of an adjacent trench to cover the garbage, ashes and refuse a continuous process, the garbage, ashes and refuse can be disposed of and covered up the same hour it is picked up, thus allowing a minimum time for decomposing in the open air.

In working any land under water where the excavating is done by a sand sucker or any territory where land is above water at lowtide, and 10 or 20 feet below water at hightide, the sand sucker starts to operate, digs a canal of any required depth or width, thereby depositing the soil on each side so as to form a natural bulk head. When the desired length is reached, the sand sucker digs across at the head of a desired angle into a desired location where a second canal will be formed. Now the garbage scows come into first canal dumping garbage, ashes, refuse, thereby filling canal to any desired height. When the desired height is reached, the sand sucker in digging canal second deposits the soil on top of the garbage, ashes and refuse in canal first and the operation is continued until canal first is completely filled with garbage, ashes and refuse and canal second is being dug at the same time by the sand sucker, and also in that same operation the sand sucker deposits the soil on both sides continuing to form a natural bulk head. When canal first is completely filled, second canal is dug and in a position to make the operation complete and continuous.

The novel features and the operation of this device will be apparent from the foregoing description. While the device has been shown and the structure described in detail, it is obvious that this is not to be considered limited to the exact form disclosed and that any changes may be made therein within the scope of what is claimed without departing from the spirit of the invention.

Having thus set forth and disclosed the nature of this invention, what is claimed is:

In the process of disposing of garbage, ashes and refuse, the steps of digging a trench, burying garbage, ashes and refuse at the bottom of said trench, digging an adjacent trench, depositing the soil dug from the second trench on top of the garbage, ashes and refuse deposited on the bottom of the first trench, burying garbage, ashes and refuse at the bottom of said adjacent trench and digging an additional adjacent trench and depositing the soil from said additional adjacent trench on the top of the garbage, ashes and refuse deposited in the first adjacent trench.

LEWIS M. McCARTHY.